April 13, 1965 J. D. HILL ETAL 3,178,688
CHARACTER RECOGNITION BY FEATURE SELECTION
Filed Dec. 20, 1962 3 Sheets-Sheet 1

INVENTORS
James D. Hill
Arthur W. Holt
BY
Max L. Libman &
Joseph A. Genovese
ATTORNEYS

CHARACTER RECOGNITION BY FEATURE SELECTION

Filed Dec. 20, 1962 3 Sheets-Sheet 2

INVENTORS
James D. Hill
Arthur W. Holt

BY Max L. Libman & Joseph A. Genovese

ATTORNEYS

CHARACTER RECOGNITION BY FEATURE SELECTION

Filed Dec. 20, 1962

INVENTORS
James D. Hill
Arthur W. Holt
BY
Max L. Libman &
Joseph A. Genovese
ATTORNEYS

United States Patent Office 3,178,688
Patented Apr. 13, 1965

3,178,688

CHARACTER RECOGNITION BY FEATURE SELECTION

James D. Hill, Washington, D.C., and Arthur W. Holt, Silver Spring, Md., assignors, by mesne assignments, to Control Data Corporation, Minneapolis, Minn., a corporation of Minnesota Filed Dec. 20, 1962, Ser. No. 246,225
7 Claims. (Cl. 340—146.3)

This invention relates to character recognition and particularly to a method and apparatus for recognizing and identifying hand-written characters or printed characters which may vary in size and detail, by scanning elemental areas of the character with an optical scanning means and identifying certain combinations of features characteristic of the respective characters to be identified.

The art of character recognition by machine has progressed to the point where it is relatively easy to identify printed characters (letters, numbers, etc.) of a particular font, where each letter (or number or sign) is always of the same size, orientation and proportion; however, in most systems, if any one of these features of a character is changed, the character can no longer be recognized by the same recognition circuit, but must be treated as a new character. This difficulty renders most such systems useless for the recognition of, for example, hand-written characters, which typically vary in all of these features; e.g., the same digit of our Arabic number system may vary appreciably even when written twice in succession by the same person, and the situation is even worse for the same digit as written by two different people.

Efforts have been made to identify written (or otherwise variable) characters by identifying certain characteristic features of each character, and one such system is shown in Patent No. 3,142,818. The present invention is directed to the same problem, but employs a basically different approach which considerably simplifies the equipment required to produce reliable and useful results. For example, the present invention does not require a separate tracking circuit for each line element of a character, but can read all of the features of a character with the equipment necessary to detect only a single feature at a time.

It is a major object of the present invention to provide a method and apparatus for the automatic recognition of printed or written characters regardless of their size, orientation, placement or proportions, by simple and reliable means. Another object is to provide a machine of this type which does not require a large amount of information storage for the recognition of complex characters.

A further object is to provide a character recognition device and method for the recognition of basic characteristic features independently of other lines or features which may exist around them.

It is a major advantage of the present invention to recognize a line by noting its beginning and its end without the necessity of tracing or tracking it, although such tracking is also easily possible.

Another advantage is that no special provision need be made for vertical registration.

According to the invention, a character to be recognized is scanned along successive parallel scan lines which repeatedly traverse the character in the same direction along successive lines which are displaced from each other by a small amount so that they cover the entire area of the character. Corresponding points or elemental areas along successive pairs of these scan lines are continuously compared during the scan in order to determine whether the optical condition under observation at each point changes from scan line to scan line. For example, if no signal is received from the character at a given point during one scan, but a signal is received from the corresponding point during the successive scan, then it is apparent that an elemental line of the character must have begun in the interval between these two scans. If, during the next succeeding scan, no change in signal is received from this point, then it is apparent that the line must be in existence between the two correspoinding points of the successive scans. If this condition remains unchanged during successive following scans, then the line must be in existenec at this point of the scan line for each of these scan lines. Ultimately, the line must come to an end, which is indicated by the fact that the signal will be in existence for one of these scan lines at that point, but not for the next succeeding scan line. It is not necessary that the scan lines be examined successively in time; they may be examined simultaneously in time, but successively in the space or area of the character under consideration. The following discussion assumes the situation where pairs of scan lines are compared sucessively in time, since this requires the least amount of equipment, but it will be understood that all of the scan lines for a given character could also be compared simultaneously in time by an extrapolation of the same equipment, which would however require considerably more apparatus. As will be explained in more detail below, the above technique is used to recognize characteristic features such as the begnning of a line element of the character, the end of a line element, the splitting of a line element into two line elements, and the joining of two line elements together. In addition, the system provides other information which may be used in identifying the character, such as whether any of the above basic features is the first or last thing that occurs during a scan line, the slope of a line, etc.

The specific nature of the invention as well as other objects and advantages thereof will clearly appear from a description of a preferred embodiment as shown in the accompanying drawings, in which.

Figure 2:
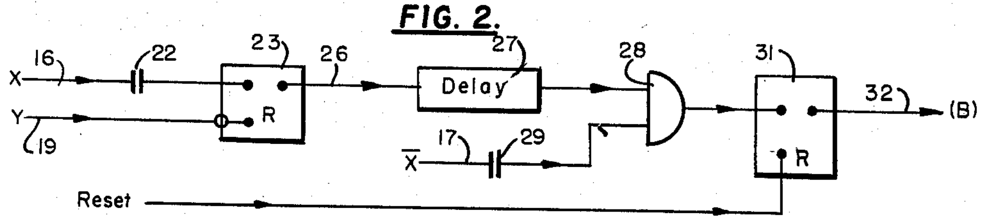
FIG. 2 is a schematic diagram of a "Begin" recognizer.
Figure 2A:
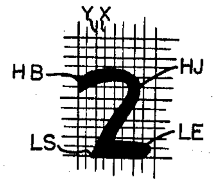
Figure 2B:
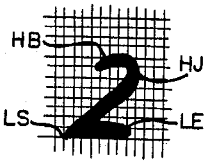
Figure 3:
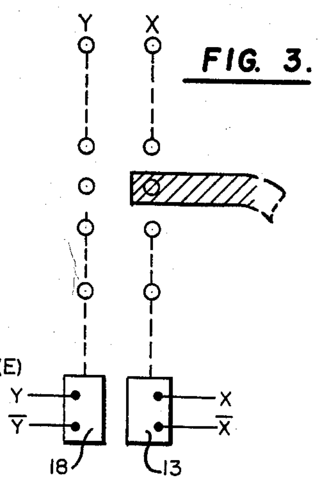
Figure 4:
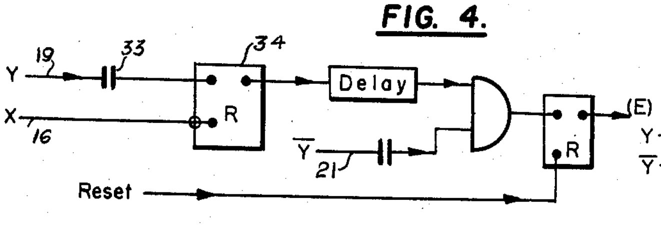
Figure 5:
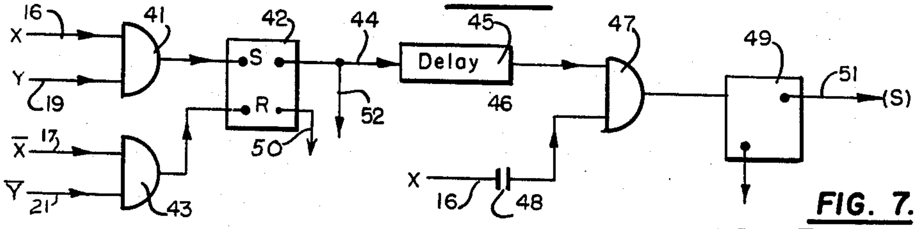
Figure 6:
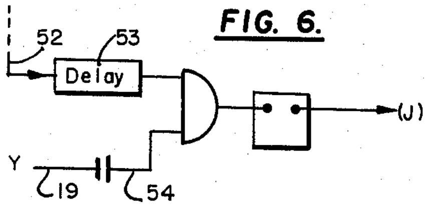
Figure 7:
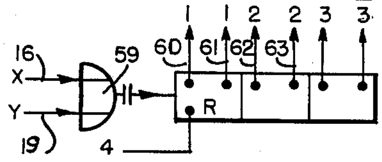
Figure 8:
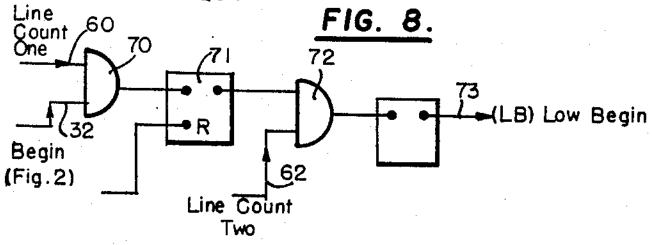
Figures 9, 10, 11, 12, 12A, 13, 14:
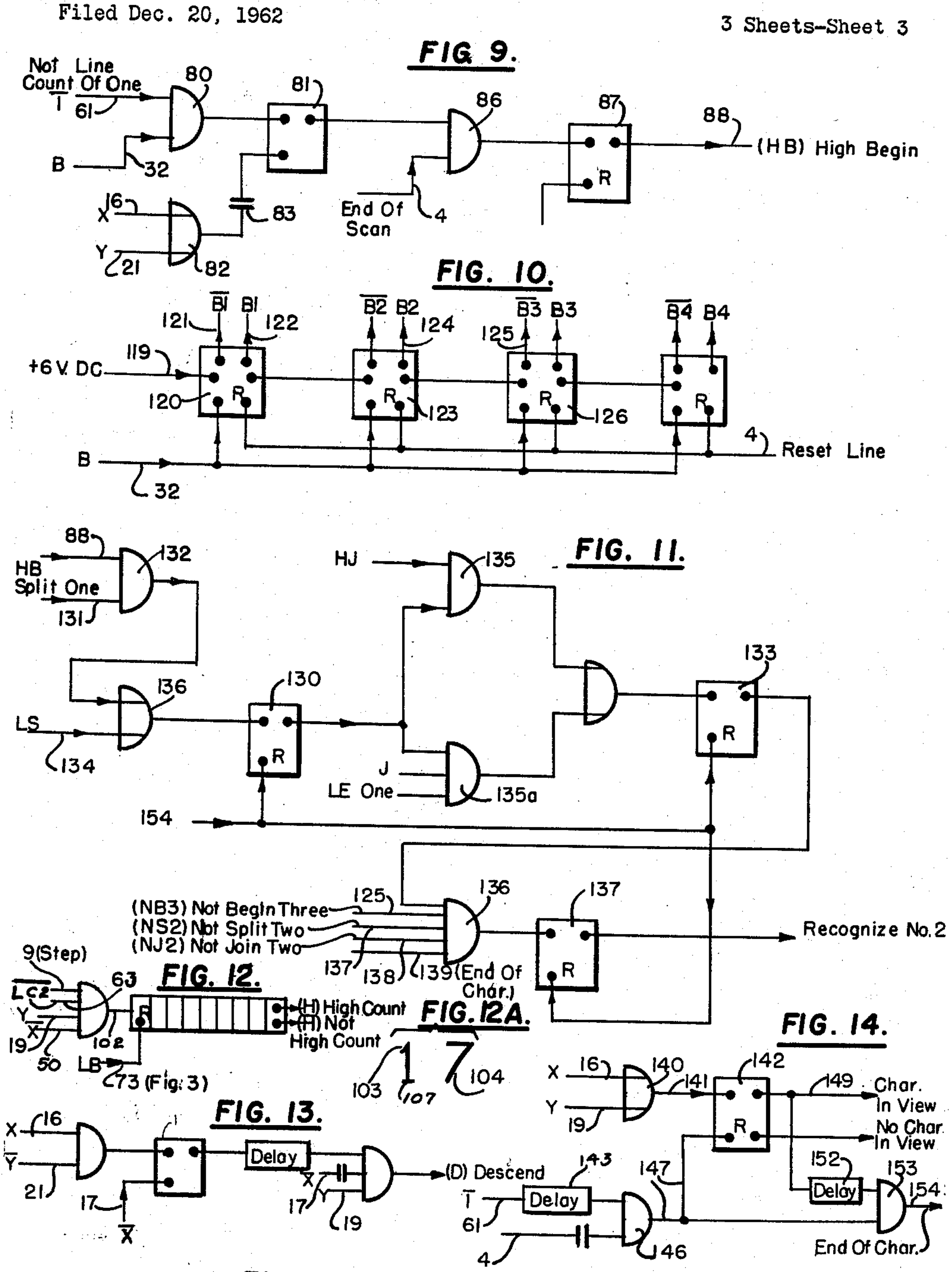
Figure 15:
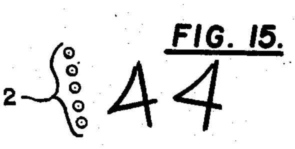

FIGS. 2*a* and 2*b* are explanatory diagrams used to identify certain portions of a character;

FIG. 3 is an explanatory diagram showing the relation of the respective stages during recognition of a "Begin";

FIGS. 4, 5, and 6 are circuits for recognizing an "End," a "Split," and a "Join," respectively;

FIG. 7 is a schematic diagram used in explaining the function of a line counter;

FIGS. 8 and 9 show circuits for recognizing a "Low Begin" and a "High Begin," respectively;

FIG. 10 shows the functions of a typical counting circuit in more detail than FIG. 7;

FIG. 11 shows a circuit for recognizing the numeral "2";

FIG. 12 shows a circuit for recognizing a High or Low line count;

FIG. 12*a* illustrates the conditions under which the line count may be used;

FIG. 13 shows a logical diagram for detecting a descending line;

FIG. 14 shows a circuit providing control signals useful in the operation of the device; and FIG. 15 shows slanting of the photocells so as to make all hand-written characters appear to slope in the same direction.

Figure 1:
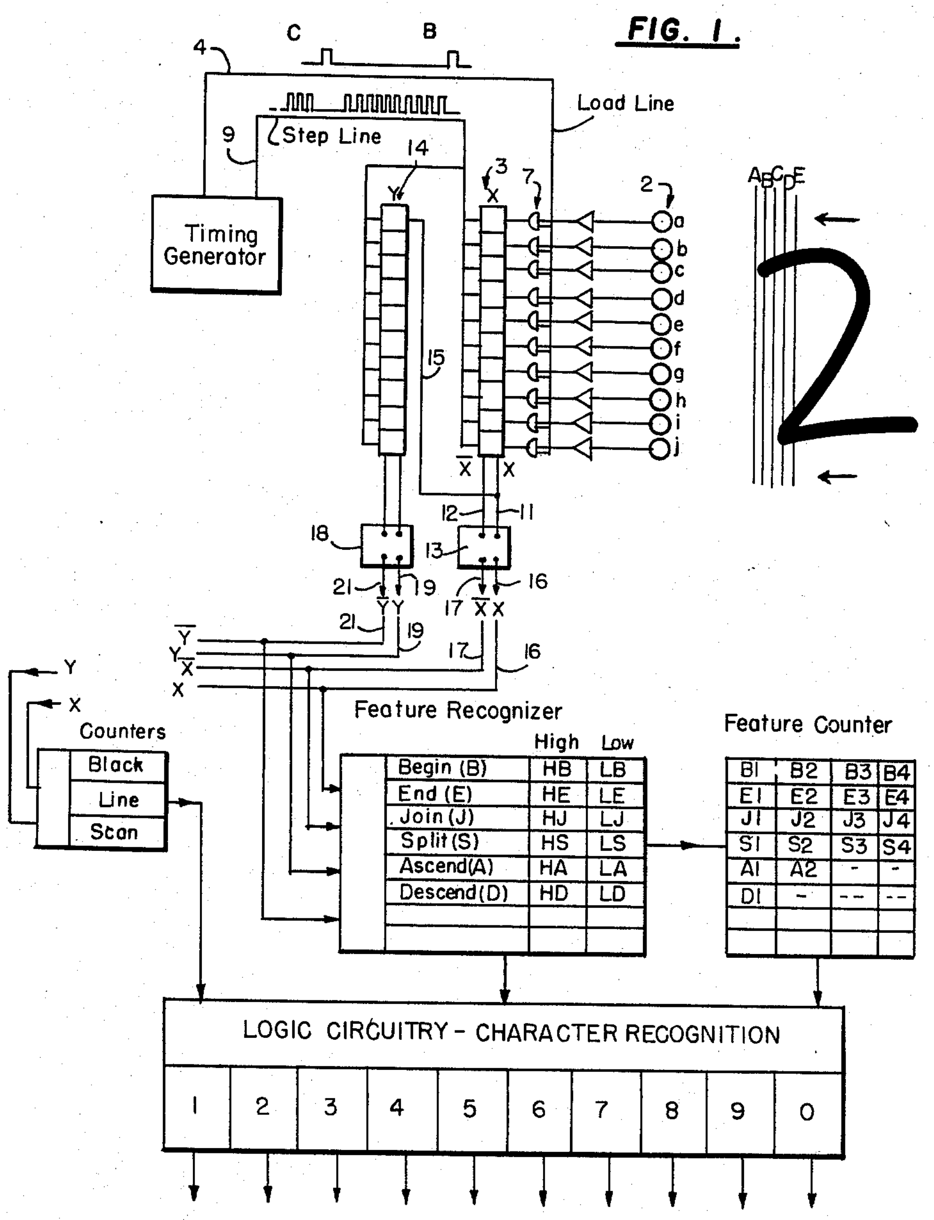
FIG. 1 is a schematic circuit diagram showing the principle of operation and the overall organization of the invention.

Referring to FIG. 1, it is assumed that the character being read, for example, numeral 2, is transported by suitable means relative to the stationary row 2 of the photocells in the direction of the a rrows. Each photocell is so arranged as to respond to light from an area generally indicated by the circle representing the photocell. In this instance, the numeral 2 is assumed to be so drawn by hand that its upper leading portion protrudes beyond the rest of the numeral, and therefore, at the instant under consideration in FIG. 1, enters the area observed by photocell *c* which therefore produces an electric signal indicative of this condition. The remaining photocells of the row at this time see white and therefore produce no signal. Each photocell of row 2 is connected to a corresponding stage of a shift register 3, the respective stages of which are normally in one condition, which we shall term "off" when their associated photocells see white, and in a different condition, which we will term "on" when the associated photocell sees black (i.e., a portion of a letter or character) over a substantial portion of its area. Thus, at the instant under consideration, all stages of the X register are assumed to be in the "off" condition. At this instant, a "Load" pulse is transmitted on line 4 to one input of each AND-gate 7, the other input of each gate being supplied with a signal from its associated photocell 2. This loads the register with signals corresponding to the conditions detected by the row of photocells 2 at the instant the load pulse is effective; in the present example, only the third stage down of register X will be affected, since only its associated photocell (*c*) at this moment sees a black portion of the character being scanned. The X register is therefore now loaded to a condition corresponding to the optical condition that the row of photocells detected at the moment of loading. As will be noted from the pulse timing diagram associated with lines 4 and 9, immediately after the load pulse arrives on line 4, the shift terminal of the X register 3 (and also of Y register 14) is supplied from line 9 with a series of very high speed clock pulses equal in number to the number of stages in each shift register, in this case shown as ten stages. This sequence of ten shift pulses alternating with one load pulse on lines 9 and 4 respectively is supplied by timing generator 5, for which purpose any suitable known type of counting or stepping circuit may be employed. To summarize the above operation, the signals from the photocells are normally blocked from reaching the shift register 3, and by the use of suitable AND-gating, controlled by a timing pulse on line 4, the optical conditions observed by the row of photocells may be stored in the shift register at any desired instant of time, and immediately thereafter shifted down and out of the register to clear it for the next load pulse.

The series of clock pulses on line 9 steps the register downward step-by-step so that each stage successively assumes a condition of the stage immediately ahead of it in the known fashion of shift registers. The lowest stage, *j*, of register 3, therefore successively assumes the conditions for all of the other stages of the shift register during this operation. This stage is provided with two terminals which are connected to output lines 11 and 12, the arrangement being such that when the stage is "on" the voltage on line 11 is in one condition (for example, high) and that on line 12 is in another condition (for example, low); when the stage is turned "off" the respective voltages on lines 11 and 12 are reversed. Line 11 is connected to line 15, which in turn is connected to the input of a second shift register 14 similar to shift register 3, and having the same number of stages. The arrangement is such that when shift register 3 is completely emptied by the series of clock pulses, shift register 14 is correspondingly loaded in the same manner as shift register 3 had been before the shift operation. In the present example, after this shift operation, shift register 14 will be in the "on" condition in its third stage down from the top, and all of the other stages will be "off." At this time, shift register 3 will be emptied and all of its stages will be in the "off" condition. After this time, the load pulse on line 4 arrives, i.e., its amplitude rises to the effective level, and circuit 7 passes the signals from the photocells 2 so that shift register 3 can again be loaded instantaneously in accordance with the optical condition beneath the row of photocells at the time when the "load" pulse arrives.

The above-described operation has occurred so rapidly in comparison with the rate of movement of the character being scanned that the character has moved only a very small distance, and therefore the second scan accomplished by the row of photocells is taken along a line slightly spaced from the first scan line and only a short distance removed therefrom, for example, as represented by the vertical line B of the lines A–F. In practice, these vertical lines may be much closer together than indicated in FIG. 1, for example, there may be as many as twenty or more scans for a full-width character. It will be noted that the last stage of the register could in principle be used as the flip-flop 13, but in practice it is desirable to have a separate flip-flop because of power and buffering consideration, etc.

In addition to supplying shift register 14, line 11 is also connected to the "set" terminal of flip-flop 13, while line 12 is connected to the "reset" terminal of the flip-flop, the arrangement being such that when stage *j* is "on" the flip-flop is set to produce an output of one level on line 16 and another level on line 17; when stage *j* is "off," the flip-flop is reset by the signal on line 12, and the voltage conditions on lines 16 and 17 are reversed. Similarly, flip-flop 18 is connected to the last stage of shift register 14 and produces at its terminals outputs corresponding to the successive stage conditions as flip-flop 14 is shifted down by incoming signals on line 13. It will thus be seen that shift register 14 always contains the results of the scan immediately preceding that currently stored in shift register 3, and that during the shifting process, flip-flops 13 and 18 at each moment represent the condition of a given point on the scan line during two successive scans. In order to generalize the following discussion, shift register 3 (the register storing the current scan information) will be designated by X, and shift register 14 (which stores the previous scan line) will be designated by Y. The output of flip-flop 13 when it is in the "set" condition will also be designated X, corresponding to the "on" condition of the shift register; conversely, when flip-flop 13 is in the "reset" stage, its output on line 17 will be designated $\overline{x}$, which is the well-known logical symbolism for "not-X."

It will now be shown how, by comparing the signals from the Y flip-flop with those from the X flip-flop, it is possible to distinguish desired characteristic features of the character being identified.

In the present disclosure, certain basic features are used for recognition of characters. It will be understood that other similar basic features could also be used, but the ones which will be described below have been selected because they have been demonstrated to be sufficient to establish the identity of hand-written numbers, with a minimum of relatively simple equipment. The major basic features which will be utilized in the following description are: (1) the beginning of a line (B), (2) the end of a line (E), (3) the splitting of a line into two lines (S), and (4) the joining of two lines together (J).

In addition to these four, other features are utilized; e.g., if a B is the first thing that occurs in a scan and later in that same scan another line is crossed, that B can be called a "Low B," since the line beginning (B) is below the line crossing. Similarly, means are provided to detect a low split (LS), low join (LJ), and low end (LE). In each case, this signifies that the feature is the bottom feature in the character and it must have some other part of the character above it. Also, it is determined whether a character line has an ascending or a descending slope.

FIG. 2 shows an example of circuitry used to detect a "begin" (B). This requires the following conditions:

first, the Y flip-flop and the X flip-flop show "white" at the same time; then the X flip-flop indicates "black" while the Y flip-flop shows "white"; then both X and Y flip-flops indicate "white." It will be remembered that these successive indications represent succeeding stages of the shift registers X and Y as the character is, in effect, being scanned upwardly in two parallel lines. Therefore, the above sequence shows that during this portion of the upward scan there occurred in the X line a piece of black which was not previously connected to any piece of black in the Y line; this must indicate the beginning of a new line.

FIG. 3 shows graphically the physical conditions represented by the above sequence. The X and Y lines represent the two successive scans which are stored respectively in the two shift registers, and as these registers are simultaneously shifted downward, their associated flip-flops 13 and 18 respectively respond to the conditions at successive points along the scan. Considering the three points shown in FIG. 3 during the period when the X scan first crosses the beginning of a character, it will be noted that since the Y scan had not yet encountered the character, all three steps in the Y register will be white, while the corresponding three steps in the X register will be white in the first step, black in the second step, and white again in the third step. This is the condition described above. It will now be shown how the circuit of FIG. 2 responds to this condition.

Line 16 from FIG. 1 is connected through condenser 22 to the "set" terminal of flip-flop 23 so that the flip-flop will be turned on by the leading edge of a signal on this line when the signal is first applied to the line. This is accomplished by the differentiating action of the condenser 22, and it will be apparent that if the flip-flop 13 remains turned on during succeeding shift steps of the X register, there will not be another input signal to flip-flop 23 until flip-flop 13 is first turned off and then turned on again. In other words, this sequence of events indicates that the X scan line is crossing a relatively horizontal line of the character, and not following a vertical line of the character. Line 19 from flip-flop 18 of FIG. 1 is connected to the "reset" terminal of flip-flop 23 so that the flip-flop will be turned on by the leading edge of a signal on line 16 only if there is not at this time a black signal from the Y flip-flop; in other words, at this time, the Y scan line is seeing white and is not crossing a portion of the character. If at a later time, there is a black "on" signal from Y, it will turn off flip-flop 23. Once flip-flop 23 is turned on, it will stay on until a signal is transmitted to its reset terminal to turn it off, as will be shown below. The output signal from flip-flop 23, on line 26, is passed through a delay line 27 which provides a delay which is long enough so that the output of condenser 29, namely, the differentiated leading edge of a $\overline{x}$ signal, will return to the off state by the time the signal from flip-flop 23 reaches AND-gate 28, and this is supplied to one input of AND-gate 28. The other input of this AND-gate is supplied with a signal on line 17 through condenser 29; if while flip-flop 23 is on, the X flip-flop 13 is turned off, a $\overline{x}$ signal will be sent on line 17 through condenser 29, and the simultaneous occurrence of both signals at AND-gate 28 will therefore actuate the "begin" flip-flop 31 which will therefore emit a B signal on line 32, thus indicating the detection of a "begin." Again, flip-flop 31 may be omitted, but is preferred for practical circuit reasons. The sequence of events is as follows: (1) The X flip-flop 13 is turned on; (2) it is then turned off; (3) during the preceding two steps the Y flip-flop 18 has not been turned on.

FIG. 4 shows a circuit for an "end" (E) detector. This is essentially the same as the B detector, except that instead of looking for an isolated black signal in the X register it looks for an isolated black signal in the Y register, i.e., an indication of black which is not adjacent to an indication of black in the other register. In FIG. 4, the input lines to flip-flop 34 are respectively connected to lines 16 and 19 of FIG. 1, as before, except that the Y line at 19 is connected to condenser 33, which differentiates the Y input signal so that the flip-flop responds to a leading edge only; i.e., the Y scan has not been tracing a vertical black line. The delayed signal from flip-flop 34 is now AND-gated with the leading edge of a $\overline{y}$ signal from line 21 of FIG. 1 of the next successive scan, indicating that the Y signal has ceased to exist at this point in the scan. It will be apparent, by the same line of reasoning as above, that the output signal on line 39 from "end flip-flop" 38 therefore denotes recognition of the end of a line of the character under examination.

FIG. 5 shows a circuit for detecting a "split" (S), e.g., the parting of two lines. Inspection of the circuit will reveal that flip-flop 42 is turned on if there is an indication of black in both the X and Y registers, and stays on as long as there is an indication of black from either the X or Y flip-flop. If both $\overline{x}$ and $\overline{y}$ appear at AND-gate 43, then flip-flop 42 will turn off. This means that the flip-flop will stay on, once turned on, until both X and Y flip-flops are turned off. The flip-flop 49 is turned on if flip-flop 42 is on and X is turned on, which is indicated by the leading edge of the next signal on line 16 passing through condenser 48. The one-step delay line 45 insures that the same signal which turns on flip-flop 42 will not turn on the split flip-flop 49 because of the delay, which is long enough so that the output of cendenser 48, namely the differentiated leading edge of an X signal will return to the off state by the time the signal from flip-flop 42 reaches AND-gate 47 through delay 45. If flip-flop 42 is turned on, then there must be at that time a black indication from the X flip-flop 13. In order to get an output from condenser 48, the X signal must be turned off, and then turned on again immediately before delivery expires. If this occurs, split flip-flop 49 will be turned on. The sequence of events here is that (1) both X and Y are on, (2) X is turned off, (3) X is turned back on again, that is, the X scan crosses one line and immediately thereafter crosses a second line; all this time the Y has been on. It is not necessary for the X and Y flip-flops 13 and 18 to turn off—the split has already been recognized and a signal produced on line 51; therefore, either X or Y may go off first and then the other one. In order to hold flip-flop 42 on while X goes off and then goes back on again, either X or Y must be on, and since X has gone off, it must be Y which stayed on. The appearance of an S signal on line 51 therefore indicates that at this point of the scan there had been a single crossing (which may be several stages long on the register) and this is now branching off into two crossings. FIG. 2*a* shows the physical situation at this point. It should be noted that the width of the line is of the order of magnitude of twice the distance between two adjacent photocells. Considering a Split such as occurred at the bottom of a "2," as the successive pairs of scan lines Y and X, in effect, sweep across the numeral, a time must come when the condition of FIG. 2*a* exists. Previously to this, when the point of the wedge entered the scan area, the Begin was recognized. At the time under consideration in FIG. 2*a*, it will be seen that the Y column will give a black signal for at least long enough to bridge the gap between the black crossings in the X register (due to the width of the line) just at the point where the X column first indicates a white space between two X's. This is, of course, the condition described above, which the circuit of FIG. 5 will recognize as a Split. It will be clear that this condition must be reached sooner or later as the scan lines sweep across the character, since there must be a point where the Y signal will be given from two adjacent photocells, while the X signal will turn off and then appear again at the point where the Split has branched off. It should be noted that although, for convenience of depicting the characters in the areas swept by the photocells, these are shown substantially square in FIG. 2*a*; in practice, they are actually long and narrow rectangles, since the speed is such that any two adjacent X and Y scans are actually much closer together than the thickness of the line in a typical case, and the photocell apertures are preferably relatively long and narrow in practice. It is therefore clear that some point must be reached where a signal will be received from two adjacent Y areas, while in the next adjacent X area there will be a blank between the two X's, in the case of a Split.

FIG. 6 shows the circuit for detecting a "Join" (J). It is generally similar to FIG. 4, except that the sequence of events is reversed. The input on line 52 is taken from flip-flop 42 of FIG. 5, since the same circuit can be used up to this point. If the input on this line is turned on and at a later time Y is turned off, then back on again, producing a signal on line 54, the "Join" flip-flop 56 will produce a J signal on line 57. During this sequence of events, flip-flop 42 of FIG. 5 must have stayed on; since Y turned off and came back on again, it must have been X which stayed on to hold on flip-flop 42.

FIG. 7 shows a line counter for counting the number of lines in any one scan. It is fed by OR-gate 59 from lines 16 and 19 (FIG. 1). In its initial condition, only line 61 in the first stage is activated, indicating that there is not even one line thus far crossed in the scan. Every time either the X or Y flip-flop is turned on, the line counter is stepped one stage, but each succeeding previously stepped stage remains energized, so that when, for example, stage three has been energized, it is still possible to obtain a signal from stage one (or stage two) showing that during the scan, at least one (or two) lines have been counted. At the end of the scan, the counter is reset to its initial condition by a suitable reset pulse, which may, for example, be taken from line 4. Stepping counters of this type are now routine in the art.

FIG. 8 shows a circuit for detecting a "Low Begin" (LB). One input of AND-gate 70 is taken from line 60 of FIG. 7, which registers a count of one, and thus indicates that at least one line crossing has occurred during the scan under consideration. The other input to AND-gate 70 is taken from line 32 of FIG. 2, which is the output of the Begin flip-flop and therefore recognizes a "Begin" (B). This will be the beginning of that same line which recognized the count of one on line 60. This combination now turns on flip-flop 71, the output of which is supplied as one input to AND-gate 72; the other input to the AND-gate is line 62 from FIG. 7, indicating a line count of two. This shows that a second line has been crossed during the scan, and therefore the Begin (B) on line 32 is a "Low Begin" (LB), since something else occurs during that scan at a higher point. In other words, this circuit recognizes a beginning which is the lowest thing in the character and above this Begin (B) there is a separate line.

If desired, the functions of FIGS. 5 and 6 can be combined to detect a "Split" (S) and a "Join" (J) in the following manner: Step (1), the X and Y flip-flops come on; (2), the X flip-flop goes off and (3), goes back on; (4), while step (3) is on, the Y flip-flop (4*a*) goes off, and then (4*b*) goes back on. This will give an indication first of a Split and then of a Join. Similarly, other desired sequences can be recognized.

FIG. 9 shows a circuit for detecting a "High Begin" (HB). AND-gate 80 is supplied at one input from line 61, which represents "Not Line Count of One" (NLC–1), which means a line count of two or more (or a line count of zero). Since this signal (NLC–1) is AND-gated with the B signal from line 32, it is impossible for the line count of zero to mean anything, since the existence of the B would automatically mean that there was at least one line. Flip-flop 81 is turned on if there is a B which is above another line. If, after this happens, a new line is seen (by either X or Y), i.e., if the OR-gate 82 of X or Y comes on, condenser 83 will pass the signal which will turn off flip-flop 81. Note that the differentiation of the OR-gate of X or Y is not the same as the OR-gate of the differentiation of X and Y. If X and Y are OR-gated first, and then differentiated, and X comes on, then there will be a signal; then Y may go on and off as it will and no further signal will occur; therefore, flip-flop 81 will not be turned off if there is nothing seen later in that scan, i.e., if a line is seen, the next line happens to be a B and there are no further lines in that scan, then flip-flop 81 will stay on until the end of the scan, which is a signal on line 4 to indicate that the entire scan has been completed. The signal on line 4 occurs every time the scan is completed, being an indication that all of the information in the scan has been seen; this signal is AND-gated with the output of flip-flop 81, through AND-gate 86, the end of the scan signal indicating that no further lines will be seen above what has already been seen, and therefore the "High Begin" (HB) flip-flop 87 will be turned on if: (1) there is a line, then (2) a line above that happens to be a "Begin" (B), and (3) there are no further lines in that scan; the end of the scan signal means that the information from the photocells has been loaded into the X register and that all of this information has been shifted down out of the X register. In order to detect a "Low End" (LE), a "Low Split" (LS), or a "Low Join" (LJ), the same type of signal as in FIG. 8 is used, except that the End, Split, and Join signals respectively are used in place of the Begin signal (line 32). By the same modification, the "High End" (HE), "High Join" (HJ), and "High Split" (HS) can be detected by circuits similar to that of FIG. 9.

FIG. 10 shows in more detail the type of counter which is used in all of the counting circuits previously discussed. This counter is in the form of a register having a series of flip-flops 120, 123, 126, etc., and is shown in connection with the B counter, which counts the number of Begins. The first flip-flop stage, 120, is always primed on line 119 with a suitable priming voltage, shown in this case as +6 volts D.-C.; therefore, when the first Begin signal comes in on line 32, indicating the first Begin in a given scan, only flip-flop 120 is set; however, this operation causes flip-flop 120 to prime the next flip-flop 123, so that when a second Begin signal comes in on line 32, the second stage will be set, and so forth. At the end of the scan, a reset signal on reset line 4 resets all of the flip-flops, leaving only the first stage, 120, primed to repeat the above-described operation during the next scan.

Referring again to FIG. 1, it will be seen that the overall system makes use of the above-described feature recognizers such as Begins, Ends, Joins, etc., in combination with feature counters which tell how many times each feature occurs during the scanning of a character, and also general counters such as line counters, scan counters, black counters, etc., all of which are constructed in accordance with the principles above described. The outputs from these various counters and recognizers can be combined in order to identify any desired character which can be recognized by virtue of its having a certain combination and sequence of such features. For example, and by way of illustration only, FIG. 11 shows a circuit for recognizing the numeral "2." This is typically written by hand in one of two forms, illustrated in FIGS. 2*a* and 2*b* respectively. In FIG. 2*a*, the first vertical scan line which encounters the character will see the High Begin first, while in FIG. 2*b*, the scan line will see the Split first. However, in spite of these differences, both forms of the numeral have certain characteristics in common, by means of which this number can be distinguished. For example, both of them have a High Begin, which is the first stroke made by the pencil; both of them have a High Join, and both of them have a Low End, all of these parts being indicated by the abbreviations used for these features in FIGS. 2*a* and 2*b*. The circuit of FIG. 11 is accordingly designed to recognize and identify these features. The beginning of the numeral "2" is detected by flip-flop 130, which responds to one of two possible situations; first a Split and then a Begin, or vice versa. The Split is indicated by "Split 1" on line 131, which will be taken from the first stage of the Split counter, and will be energized when at least one Split has been recognized. AND-gate 132 also requires a High Begin signal on line 88 (FIG. 9), which is taken from the output of the High Begin recognizer. Alternatively, the first part of the numeral "2" can be detected simply by a Low Split signal on line 134, which is taken from the output of the Low Split recognizer. Either of these situations causes a signal to pass OR-gate 136 to turn on flip-flop 130. It will be noted that the presence of a Split also implies a Begin, since the line cannot split until it has first begun. Also, if there is a Low Split, it shows that there are two lines and that the bottom one is split. After flip-flop 130 has been turned on, flip-flop 133 may be turned on by either of two situations: (1) there occurs a High Join (HJ), that is, a Join above a line and no line above it; or (2) there is a Low End (LE), i.e., a count of one in the Low End Counter, and a Join. If either of these situations occurs, flip-flop 133 is turned on if flip-flop 130 has already been turned on. This is provided by AND-gates 135 and 135*a*, together with the leads shown, corresponding to the above conditions. While flip-flop 2 will be turned on if all of the conditions necessary for a numeral "2" exist, it happens that the same conditions would also be found in certain other numerals, such as, for example, an "8." In order to distinguish between the "2" and, for example, an "8," certain negative features must also be added. AND-gate 136 establishes the remaining conditions which must be satisfied in order to identify a "2." An "8" will have two Splits and two Joins, which the "2" does not have; therefore leads on lines 137 and 138 are provided to AND-gate 136 from "Not Split Two" and "Not Join Two" respectively, these being taken from the second stage of the Split and Join counters respectively; line 125, which may be taken from the negation terminal of the third stage counter 126 of FIG. 3, and indicates that there have not been three Begins; and a signal on line 139 denoting the end of the character. (This signal may be taken from the X and Y registers when they are both clear.) If all of these conditions are satisfied, then the flip-flop 141 is turned on, producing an output signal on line 142 which indicates that the character "2" has been recognized. The reason for line 125 is that the numeral "3" has three Begins, but may possibly otherwise satisfy the requirements of the "2," and therefore the counting of a third Begin would extinguish the signal on line 125, and cause flip-flop 141 to remain unenergized if the numeral being examined were a "3" instead of a "2." Similarly, if after all of the above features had been recognized, the character did not end, but continued with further strokes, then whatever it is, it is not a "2" and therefore the "2" flip-flop 141 will not be energized.

It will thus be apparent that in order to recognize any character, certain features which identify this character must occur in a certain sequence, and a simple logic circuit can be designed to respond uniquely to the desired combination of features and then only if other undesirable characteristics are not present. It will be apparent that the same type of analysis can be applied to any desired numeral or letter, and that this recognition will be independent, within wide limits, of wide variations in size, shape, orientation, etc. We are aware that prior art attempts have been made to identify characters by certain features, but not by the basic and elemental features used in the present invention. Every character must be composed of lines which begin or end either high or low in the character, join other lines, or merge into other lines, and, when they are sloping lines, either ascend or descend with respect to the direction of relative character motion. All of these characteristics, in the present invention, are readily identified by merely comparing correponding points of two adjacent vertical scans. Thus, by relatively simple and inexpensive means, a character identification system has been actually constructed which is capable of reliably recognizing hand-written characters if drawn with reasonable care, with a high degree of reliability. However, the invention is not restricted to hand-written characters, but is also useful in connection with printed characters, since it is capable of recognizing individual characters regardless of slight differences in size or font. Fixed font recognition circuits have been developed, but these will treat even two differently sized versions of the same letter as two entirely separate and distinct letters or numbers, each one requiring a separate recognition system. According to the present invention, the same letter recognition system will identify the same character regardless of such minor variations.

The slope of the line, that is whether it is ascending or descending, together with some information about the relative duration of the slope, may in some cases be useful in distinguishing between characters. For example, referring to FIG. 12*a*, it will be seen that there is considerable similarity between the characteristic features of the numerals "1" and "7," as here drawn. These can be distinguished by the circuit shown in FIG. 12, in which AND-gate 101 has four inputs. One input, on line 9 (FIG. 1), receives the step pulses which cause the registers X and Y to shift downward. Line 63 (FIG. 7) is energized when there has not been a count of two on the line counter, that is, the information on the X and Y flip-flops comes from the first line of the character. Lines 19 and 17 respectively (FIG. 1) are energized when there is a black in the Y flip-flop and a white in the X flip-flop. When all of these conditions are satisfied, the AND-gate passes a signal to line 102. This signal will be in the form of a series of pulses corresponding to those clock pulses which occur during the time when the underside of the first line of the character is sloping upward. This is due primarily to the relationship between lines 17 and 19. The number of pulses passed will be those which occur during the time when the first line of the character (that is, the lowest line) is crossed, and the line is sloping upward (that is, during the time when Y is on and X is off). This is true of the slope 104 of character "7," and may be true of the slope 107 of character "1." However, the slope 107 is of short duration (if it slopes at all), while the slope 104 will be of considerably longer duration. Counter 106 will therefore record a much higher count for a "7" than for a "1." If, while the counter is counting, a Low Begin is detected, corresponding to serif 107 of numeral "1," this signifies that what it has been counting was not the bottom part of a character, but may have been, for example, slope 103. The counter is therefore reset to zero by the Low Begin signal on line 73. It will be apparent therefore that this unit can be used in conjunction with others which identify the character as either a "1" or a "7," to distinguish between these two possibilities and determine whether it is in fact a "1" or a "7." The common characteristics of the two numbers are that there is one Begin followed by another Begin; there is a Join; and there is one End. If this sequence of events is satisfied, the character is either a "1" or a "7." If, in addition, a high count is stored in the counter 106, then it is decided that the figure is a "7." Correspondingly, if a low count (or Not High Count) is recorded in the counter, after the other conditions have been satisfied, then the character is a "1."

FIG. 13 shows the logic diagram for detecting a descending line. Flip-flop 109 is turned on by a signal from AND-gate 108, if X is on and Y is not on. It stays on as long as X stays on, being reset by a signal from line 17. If, while flip-flop 109 is on, or immediately thereafter, as provided by the delay 111, X turns off while Y is on, AND-gate 112 emits a signal on line 113, which indicates a descending line. A descending line is thus detected when a line is crossed by both X and Y, and X sees the line first while Y sees it last, assuming an upward sweep of the scan line.

In a practical apparatus corresponding to the overall system shown in FIG. 1, it should be noted that each photocell is preferably in the form of a thin vertical slit, which moves horizontally relative to the character, so that each cell sweeps out a rectangular area. The control timing generator 5 (FIG. 1) generates timing pulses which are supplied to lines 9 and 4 as previously described. The counters count such things as the number of black spaces vertically in any one scan, the line counter counts the number of lines in any one scan, and the scan counter counts the number of scans in any one character. In the present state of the art, the circuitry for such counters is, of course, routine, being generally similar to those previously described, and it would serve no purpose to illustrate each one by an example. The feature counters keep a record of the number of features counted in any one character. For example, the Begin counter (FIG. 10) counts up to three Begins. An input signal on line 32 actuates flip-flop 120, which had previously been emitting a signal on line 121 indicating that there was no first Begin, and which now emits on line 122, indicating that there is at least one Begin. The arrangement is such that a second Begin signal on line 32 leaves flip-flop 120 still on, but actuates flip-flop 123, so that now both flip-flops produce signals on lines 122 and 124 indicating that there have been at least two Begins during this scan. Similarly, a third signal will be registered on flip-flop 125. In this manner, information is available as to whether there has been or has not been a Begin at each stage. A definite signal is also available which indicates that there have not been one, two or three Begins as the case may be. For some features, such as High Begin, High End, etc., a one-stage counter is sufficient, and makes available information as to whether the event specified has occurred at least once or not.

The information from the counters, the feature recognizers, and the feature counter, is fed into the logic circuitry 71, constructed in accordance with the principles explained above, to distinguish, in this case, the various number digits. The same principles can also be used to distinguish various written letters or other characters. The number recognizers are arranged, as explained above, to detect certain sequences and numbers of charactertistic features which are sufficient to distinguish the numbers or letters to be recognized. Control circuits are also employed to detect the presence (any black in X or Y registers) and the end of a character. The end of a character is, of course, recognized by the absence of any signals during a complete shifting run in both flip-flops 18 and 13, or in one of them. The beginning of a character is similarly recognized by the presence of a signal during a scan line (rippling out of the shift register). When the signal for the end of a character occurs, all of the sequence detectors are reset so as to be ready to read the next character. The feature recognizer and scan counters are also reset at the end of the character. Actually, the feature recognizers are reset as soon as they have detected a feature, so as to be able to recognize the feature if it occurs again during the scan line. The line counter is reset at the end of each scan, and the black counter, which counts the number of spaces in the X or Y L register which a line occupies, is reset immediately when that line has been scanned.

FIG. 14 shows an example of a circuit which may be used to provide signals indicative of certain events during the reading of a character, and particularly a signal indicating the end of a character which may be used for resetting all character recognizers (for example, the one shown in FIG. 11) and all parts of character recognizers which may need to be reset after having accomplished their function. OR-gate 140 receives signals from lines 16 and 19, so that during any scan, a signal on line 141 indicates that some black has appeared in the X or Y registers. This sets flip-flop 142, so that an output on its normally inactive line 149 indicates that there is a character in view. Similarly, an output on the normally high output line 141 (which is high when line 149 is low and vice versa) indicates that there is not a character in view. Flip-flop 142 is reset by a signal on line 147, which is passed by AND-gate 146 under the following conditions: A signal on line 61 through delay 143 occurs if the line counter recognizes a count of "not one," i.e., there have been no lines at all, and at the same time a pulse arrives on line 4 through capacitor 144, indicating the end of a scan. This means that during the preceding scan no black has been seen. Delay 143 is needed in line 61 since line 4 resets the line counter, and time must be provided to ensure that the signal on line 61 occurs after that event. The output from AND-gate 146 also provides one input to another AND-gate 153, the other input being taken from line 149 through delay 152, again to ensure the proper sequence of events. The output on line 154 therefore indicates the end of a character since a character was seen, as indicated by the presence of a signal on line 149, but there is no longer any black signal during an entire scan, indicating that the character has ended. This signal on line 154 may be used, for example, to reset flip-flops 130, 133, and 137 in the No. 2 recognizer shown in FIG. 11, and similarly to reset the flip-flops in the other character recognizers.

Most people write characters slanting upward to the right, but since some write a slight upward slant to the left, in order that they may all by treated similarly, it may be advantageous in some cases to slant the row of photocells sufficiently to make practically all characters slant in the same direction with respect to the row of photocells, so that they will all appear to be slanting up to the right in various degrees. The principles of this is illustrated in FIG. 15, where the numeral "4" is shown written with both kinds of slant, but due to the more pronounced slant of the row of photocells 2′, it is apparent that both numerals will appear to be slanted in the same direction but in different degrees with respect to the line of the photocells.

The numeral "1" is a special case, since it is usually written as a single straight line with a slight slant to the right; this numeral can be detected as a character which has less than a certain number of scans on it, depending on the fineness of the scanning. In a practical embodiment of the invention, the fineness of scanning was such that seven scans would encompass the horizontal extent of any reasonably drawn numeral "1"; therefore, at the end of the character signal, if the scan counter in this device has seven or less recorded in it, and at some time during the reading of the character, a flip-flop (appropriately gated) noted that during a single scan there were at least seven successive blacks, this is sufficient to indicate that the character being read is a long vertical line that can only be the numeral "1." Of course, appropriate negative gating as shown at 136 in FIG. 11 must also be employed to eliminate any additional features, since a long vertical line also appears, for example, in the numeral "4." It will be apparent from the foregoing that the above-described principles can be employed to distinguish any desired character from any other.

While the invention has been described in terms of the comparison of two vertical scans (X and Y), and this is the preferred embodiment because of the simplicity of equipment, it would also be possible to use one or more additional scan lines, consecutive or otherwise, to obtain additional information which would enable a more detailed comparison of the character to be made, in accordance with the principles outlined above . A distinctive feature of the invention according to these principles resides in the fact that rather than noting specific static characteristics of the character to be recognized, the manner in which certain elements vary or change from scan to scan is the thing which is made use of. Similarly instead of a stationary row of photocells as above described it will be apparent that a scanning disc with continuous scan could be used, suitable provision being made for storing in X and Y registers, the results of successive scans. While the registers are shown as shift registers composed of a line of flip-flops, it will similarly be apparent that these could be two delay lines, or one delay line together with a stepping register of the type shown. Alternatively, magnetic storage registers of known type could be employed, such as a high speed magnetic drum or disc, the use of such devices as storage and shift registers being now well-known in the art.

It will be apparent that the embodiments shown are only exemplary and that various modifications can be made in construction and arrangement within the scope of the invention as defined in the appended claims.

We claim:

1. Means for identifying optically readable line-trace characters such as handwritten characters comprising:

(*a*) a scanning device, and means for providing relative motion in a predetermined first direction between said scanning device and a character to be examined;

(*b*) said scanning device comprising means for scanning along a series of spaced lines across each of said characters in a direction generally transverse to said first direction, including means for effectively dividing said scan line into a series of elemental area segments, to produce a series of signals, one for each of said area segments, indicative of the presence or absence of a significant portion of a character in each segment during the scan;

(*c*) first shift register means having a series of stages, each corresponding to one of said area segments, said stages being in a normally "off" condition, means for setting each stage into an "on" condition in response to a signal from said scan means indicative of the presence of a substantial portion of a character in its associated area segment, to thereby store data corresponding to a single scan line;

(*d*) second shift register means similar to the first and having a corresponding number of stages, but arranged to store signals corresponding to a different scan line from said single scan line;

(*e*) separate indicating means for each register responsive to the condition of the last stage of each register so as to indicate the "on" and "off" conditions of said last stage;

(*f*) means for simultaneously shifting out both registers stage by stage, into said indicating means;

(*g*) comparison means for comparing the "on" and "off" indications of said respective indicating means during said shifting operations and thus determining the manner in which portions of a character intercepted by said scan lines vary during the respective scanning operations, to distinguish characteristic features of the character;

(*h*) and means responsive to unique combinations of such characteristic features to identify characters being scanned.

2. The invention according to claim 1, and (*i*) means supplying said second shift register with the data contained in the first shift register during the shifting out of the first register, so that the second register at any time contains the data previously contained by the first register.

3. The invention according to claim 2, and (*j*) one of said characteristic features being the end of a line of the character, the means for identifying said end comprising flip-flop means for producing a "set" signal in response to a signal from the second register indicator representing the beginning of an "off" signal from any stage of the second register, only in the absence of an "on" signal from the first register indicator during the corresponding stage of the first register;

(*k*) means for producing a "change" signal upon a subsequent change of condition of said indicating means for the second register from on" to off"; and (*l*) AND-gate means responsive to the coincidence of said set signal and said change signal to produce an "end" signal.

4. The invention acording to claim 3, and (*m*) further means for identifying said "end" of the character as occurring either high or low in the character by producing a signal corresponding to another interception of the character during the same scan line and gating said other signal to produce a "high-end" or "low-end" signal depending on whether said other intercepiton occurs prior to or subsequent to the interception corresponding to the "end" signal.

5. The invention according to claim 1, and (*i*) one of said characteristic features being the splitting of a line into two lines, the means for identifying said split comprising (*j*) flip-flop means for producing a "set" signal in response to the coincidence of "on" signals from two corresponding stages of the two registers;

(*k*) said flip-flop means being reset by the subsequent coincidence of "off" signals from corresponding stages of the two registers;

(*l*) means producing a "change" signal upon a subsequent change of a stage of the first register from "off" to "on"; and (*m*) means responsive to the coincidence of said "set" signal and said "change" signal to produce a "split" signal.

6. The invention according to claim 1, and (*i*) one of said characteristic features being the joining of two lines into a single line, the means for identifying said "join" comprising (*j*) flip-flop means for producing a "set" signal in response to the coincidence of "on" signals from two corresponding stages of the two registers;

(*k*) said flip-flop means being reset by the subsequent coincidence of "off" signals from corresponding stages of the two registers;

(*l*) means producing a "change" signal in response to a subsequent change of a stage of the second register from "off" to "on"; and (*m*) means responsive to the coincidence of said "set" signal and said "change" signal to produce a "join" signal.

7. The invention according to claim 1, and (*i*) one of said characteristic features being a descending slope of a line of the character being read, means for identifying said feature comprising (*j*) AND-gate means responsive to the coincidence of an "on" signal from a stage of the first register and and a "off" signal from a corresponding stage of the second register;

(*k*) flip-flop means supplied by the output of said AND-gate to produce a "set" signal indicative of a descending slope; and (*l*) means for resetting said flip-flop on a subsequent "off" signal occurring in the first register.

References Cited by the Examiner

UNITED STATES PATENTS

| | | | |
|---|---|---|---|
| 2,889,535 | 6/59 | Rochester et al. ______ | 340—146.3 |
| 3,072,886 | 1/63 | Greanias et al. ______ | 340—146.3 |

MALCOLM A. MORRISON, *Primary Examiner.*